United States Patent
Kamiyama et al.

(10) Patent No.: US 7,441,950 B2
(45) Date of Patent: Oct. 28, 2008

(54) PROBE FOR ELECTRONIC CLINICAL THERMOMETER

(75) Inventors: Jun Kamiyama, Tokyo (JP); Shigeru Takada, Tokyo (JP)

(73) Assignee: Ishizuka Electronics, Corp., Tokyo (JP)

( * ) Notice: Subject to any disclaimer, the term of this patent is extended or adjusted under 35 U.S.C. 154(b) by 259 days.

(21) Appl. No.: 11/376,461

(22) Filed: Mar. 15, 2006

(65) Prior Publication Data

US 2006/0209920 A1  Sep. 21, 2006

(30) Foreign Application Priority Data

Mar. 16, 2005 (JP) ............................. 2005-074305

(51) Int. Cl.
*G01K 7/00* (2006.01)
*A61B 5/01* (2006.01)

(52) U.S. Cl. .................... 374/185; 374/208; 374/183; 338/28; 600/549

(58) Field of Classification Search .............. 374/208, 374/183, 185; 338/25, 28; 600/549
See application file for complete search history.

(56) References Cited

U.S. PATENT DOCUMENTS 4,666,656 A * 5/1987 Bertrand ................. 376/247

FOREIGN PATENT DOCUMENTS

JP         02170401 A  *  7/1990
JP         2001-74305       3/2001

* cited by examiner

*Primary Examiner*—Gail Verbitsky
*Assistant Examiner*—Mirellys Jagan
(74) *Attorney, Agent, or Firm*—Reising, Ethington, Barnes, Kisselle, P.C.

(57) ABSTRACT

Providing a probe for an electronic clinical thermometer, which can measure a surface temperature and a deep body temperature of a human body securely in short time, the probe includes a cylindrical housing, a bottomed metal pipe fitted into a top end of the cylindrical housing, and a substrate having two thin-film heat-sensitive elements arranged perpendicularly on an inner wall of the bottomed metal pipe so as to fix one side edge of the substrate tightly on the inner wall. By measuring heat flux between the two thin-film heat-sensitive elements, the surface and the deep body temperatures of the human body can be predicted by applying the measured values into a heat conduction equation without waiting the sensor to reach in heat balance.

7 Claims, 4 Drawing Sheets

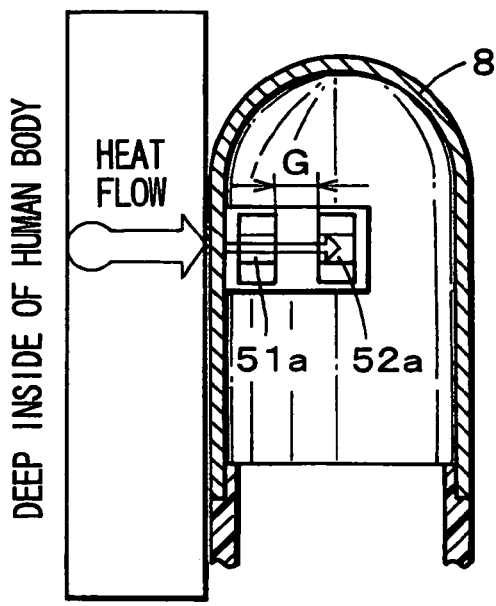
F I G. 4A
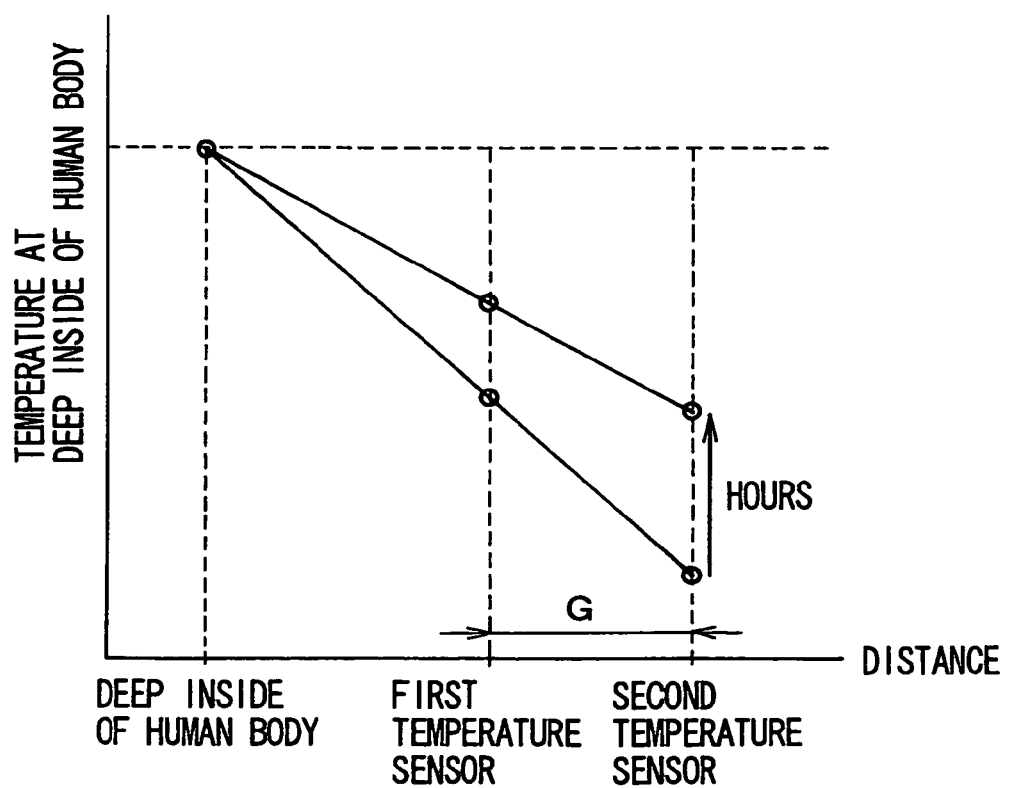
F I G. 4B

PROBE FOR ELECTRONIC CLINICAL THERMOMETER

REFERENCE TO RELATED APPLICATIONS

This application claims the benefit of Japanese Patent Application No. 2005-074305 filed on Mar. 16, 2005.

BACKGROUND OF THE INVENTION

1. Field of the Invention

This invention relates to a probe for an electronic clinical thermometer, especially a structure of a temperature sensor including a thin-film thermistor, which is provided at a top end of the probe for measuring heat flux to predict a temperature of an object to be measured, especially a body temperature of a human body at any point from a surface to a deep part body of a human body.

2. Description of the Related Art a usual method of measuring temperatures, including body temperatures, is performed by use of heat conduction, heat convection or heat radiation. The method requires a condition that the temperature sensor and the object to be measured should be in heat balance. Thereby, when the object to be measured has low heat conductivity, reaching in heat balance requires much hours, and shortening time for measuring causes lower measurement accuracy.

a surface temperature of the human body is lower than a deep body temperature thereof because of heat radiation from the surface of the human body. When the heat radiation could be perfectly prevented, the surface temperature will equal the deep body temperature. To overcome the above problems, a clinical thermometer, which can measure the deep body temperature by touching it on the surface of the human body, was developed.

Japanese Published Patent Application No. 2001-522466 proposes a method of measuring body temperatures of the human body by measuring heat flow. FIG. 5 is an illustrated cross-sectional view showing an inside of a top end of a probe, in which a temperature sensor disclosed in the above application is provided. According to the probe, a first temperature sensor 10 and a second temperature sensor 11 are formed on a flexible printed circuit board by photo-etching so as to provide a part of the flexible printed circuit board as a heat insulator 12 between the first temperature sensor 10 and the second temperature sensor 11. The flexible printed circuit board, on which the above sensors are formed, is rolled up or folded and inserted into the probe so as to touch the first temperature sensor 10 thermally to an inner wall of a metal case 13. The deep body temperature of the human body is calculated by heat conduction equation with measurement values of temperatures of the first temperature sensor 10 and the second temperature sensor 11 separated by the heat insulator 12 when a top end of the metal case 13 of the probe is touched to the surface of the human body. In other words, the deep body temperature of the human body is calculated with values of heat flow measured between the human body and the first temperature sensor and between the first temperature sensor and the second temperature sensor by the heat conduction equation. Measuring heat flow does not require waiting the sensors to reach in heat balance, so that the body temperature can be measured accurately and immediately.

SUMMARY OF THE INVENTION

Objects to be solved

As shown in FIG. 5, a usual structure of the top end of the probe by the method of measuring heat flow requires rolling up or folding the flexible printed circuit board, on which the first temperature sensor 10 and the second temperature sensor 11 are arranged in parallel to be separated by the heat insulator, and inserting it into the probe so as to touch the first temperature sensor 10 thermally to the inner wall of the metal case 13. It is very difficult to wire lead wires in such a narrow room in the small probe like a probe for clinical thermometer, and to provide and fix the flexible printed circuit board in the metal case so as to roll up it and touch it thermally to the inner wall of the metal case. In process of assembling the probe, the lead wire is possibly broken and efficiency of process is low and percent defective is large.

Use in a condition to roll up or fold the flexible printed circuit board, on which the first temperature sensor and the second temperature sensor, and insert it into the metal case makes the sensors under stress. Therefore, reliability of electric performances in a long period is relatively low.

To overcome the above problems, object of the present invention is to provide a probe for an electronic clinical thermometer, which can assemble the probe easily and efficiently and improve reliability in a long period.

How to attain the object of the present invention

In order to attain the above objects, a probe for an electronic clinical thermometer according to the present invention includes a temperature sensor having two thin-film heat-sensitive elements (a first thin-film heat-sensitive element and a second thin-film heat-sensitive element) formed on one substrate. The substrate is fixed in the probe so as to touch one side edge of the substrate thermally to an inner wall of a bottomed metal pipe forming the probe. Thereby, by measuring heat fluxes (a) between a human body and the first temperature sensor, and (b) between the first temperature sensor and the second temperature sensor, temperatures at any points from a surface to a deep part body of the human body can be calculated. Algorithm to predict a deep body temperature of the human body by heat conduction equation will be described. One-dimensional heat conduction equation excluding a heat source can be defined by a following formula (1).

$$\rho C(dT/dt) = d/dx(\kappa(dT/dx)) \tag{1}$$

herein, $\rho$ is density of an object (substrate in this case) having heat flow;

C is Specific heat of the object (substrate);

T is a temperature at a point of the object;

t is a time corresponding to the temperature;

x is a distance of the point; and $\kappa$ is heat conductivity of the object.

In the formula (1), by defining a gap between the first temperature sensor and the second temperature sensor as $\Delta x$, a difference of heat fluxes between a heat flow input side $x=x(in)$ and a heat flow output side $x=x(out)$ is shown by a following formula (2).

$$dT/dt = [\kappa(dT/dx)|_{x=x(in)} - \kappa(dT/dx)|_{x=x(out)}]/\rho C \Delta x \tag{2}$$

One-dimensional heat flux q is defined by following equation (3).

$$q = -(\Delta T/\Delta x) \tag{3}$$

By applying calculus of finite differences, the formula (2) can be described as following formula (4):

$$[T(t+\Delta t)-T(t)]/\Delta t = [\rho(T(t+\Delta t)-T(t))/\Delta x|_{x=x(in)}\rho(T(t+\Delta t)-T(t))/\Delta x|_{x=x(out)}]/\rho C \Delta x \tag{4}$$

The first thin-film heat-sensitive element and the second thin-film heat-sensitive element are arranged at $x=x(in)$ and $x=x(out)$ with a distance of $\Delta x$. When the first thin-film heat-sensitive element touches thermally to an object, temperature change caused by heat transference is shown approximately as following formula (5):

$$T(t+\Delta t)-T(t)=a(\text{in})[T(B)-T(S1)]-a(\text{out})[T(S1)-T(S2)] \quad (5)$$

herein, T(B) is temperature of the object;
T(S1), T(S2) are temperatures at the first and second thin-film heat-sensitive elements; and a(in) and a(out) are described from the above formula respectively as following formula (6):

$$a(\text{in})=\kappa\Delta t/\rho C \Delta x^2 |_{x=x(in)}, \ a(\text{out})=\kappa\Delta t/\rho C\Delta x^2|_{x=x(out)} \quad (6)$$

According to the above formula, temperature change at a position of [x(in)+x(out)]/2 is defined by a balance of subtracting heat to output from the probe, a(out)[T(S1)−T(S2)], from heat to be inputted from the object, a(in)[T(B)−T(S1)]. In the probe for the electronic clinical thermometer according to the present invention, unknown values of T(B), a(in) and a(out) can be calculated by using the above formula with measured temperatures corresponding to heat flux without waiting the temperature sensor to be in heat balance.

More physically, the probe for an electronic clinical thermometer according to the present invention includes a cylindrical housing, a bottomed metal pipe fitted into a top end of the cylindrical housing, and a temperature sensor inserted and fixed in the bottomed metal pipe for measuring heat flux to predict a body temperature. The probe is characterised in that the temperature sensor includes a substrate and two thin-film heat-sensitive elements formed on the substrate. The substrate, on which the two thin-film heat-sensitive elements are mounted, is arranged perpendicularly on an inner wall of the bottomed metal pipe so as to fix one side edge of the substrate tightly on the inner wall for thermally coupling the inner wall of the bottomed metal pipe and the substrate, on which the two thin-film heat-sensitive elements are mounted.

Preferably in the probe for an electronic clinical thermometer mentioned above, the two thin-film heat-sensitive elements formed on the substrate, which structures the temperature sensor, fixed on the inner wall of the bottomed metal pipe are arranged respectively at an upstream side and a downstream side of heat flow.

The probe for an electronic clinical thermometer mentioned above preferably further includes a long strip printed wiring board having a wiring pattern to form lands at an end thereof and lead terminals. The printed wiring board is inserted in the bottomed metal pipe. The temperature sensor is electrically connected with the lands at the end of the printed wiring board so as to fix the temperature sensor tightly on the inner wall of the bottomed metal pipe.

Effects of the Invention

According to the probe for the electronic clinical thermometer, since the temperature sensor including the two thin-film heat-sensitive elements formed on one substrate is inserted into the bottomed metal pipe fitted in the top end of the cylindrical housing and arranged perpendicular to the inner wall of the bottomed metal pipe so as to fix one side edge of the substrate tightly on the inner wall of the bottomed metal pipe, the substrate, on which the two thin-film heat-sensitive elements are mounted, is connected thermally to the inner wall of the bottomed metal pipe. Thereby, when heat to be inputted from the one side edge of the substrate of the temperature sensor fixed tightly on the inner wall of the bottomed metal pipe flows through the substrate, temperature difference between the two thin-film heat-sensitive elements formed with a predetermined distance on the substrate is generated. By applying temperature values measured by the two thin-film heat-sensitive elements into the heat conduction equation, the deep body temperature can be predicted. The temperature can be given faster than a usual clinical thermometer without waiting the sensor to reach in heat balance.

The one side edge of the substrate, in the area of which the first thin-film heat-sensitive element is formed, is fixed tightly on the inner wall of the bottomed metal pipe to be arranged at the upstream side of heat flow, so that the heat flow from the bottomed metal pipe can be conducted securely through the substrate to the two thin-film heat-sensitive elements.

According to the probe for the electronic clinical thermometer, the temperature sensor structured by the one substrate, on which the two thin-film heat-sensitive elements are formed, is fixed on one end area of the long strip printed wiring board having a wiring pattern so as to project the one side edge of the temperature sensor from the printed wiring board. Terminals of the two thin-film heat-sensitive elements are connected to the wiring pattern and outputs of the two thin-film heat-sensitive elements are outputted from output terminals formed at the other end area of the printed wiring board. Thereby, the temperature sensor can be inserted easily into the cylindrical housing, in which the bottomed metal pipe is fitted, and the one side edge of the substrate structuring the temperature sensor can be securely arranged perpendicularly on the inner wall of the bottomed metal pipe. Thus, the one side edge of the temperature sensor can be easily fixed tightly on the inner wall of the bottomed metal pipe. The printed wiring board can be designed to follow a cross-sectional shape of the cylindrical housing and the bottomed metal pipe so that operation of fixing the temperature sensor, on the inner wall of the bottomed metal pipe becomes easier and efficiency of manufacturing it is improved.

According to the probe for the electronic clinical thermometer, the one side edge of the substrate, on which the two thin-film heat-sensitive elements are formed, is fixed on the inner wall of the bottomed metal pipe with one of resin and adhesive. Thereby, even if vibration or shock is acted on the probe when the probe is used, damage of thermally touching the substrate and the inner wall of the bottomed metal pipe is prevented, and the temperature can be measured securely.

The above and other objects and features of this invention will become more apparent from the following description taken in conjunction with the accompanying drawings.

BRIEF DESCRIPTION OF THE DRAWINGS

FIG. 4A is an illustration showing principle of measurement with heat flux;

FIG. 4B is a graph showing principle of measurement with heat flux;

DESCRIPTION OF THE PREFERRED EMBODIMENT

An embodiment of a probe for an electronic clinical thermometer according to the present invention will be described with reference to figures.

Figure 1:
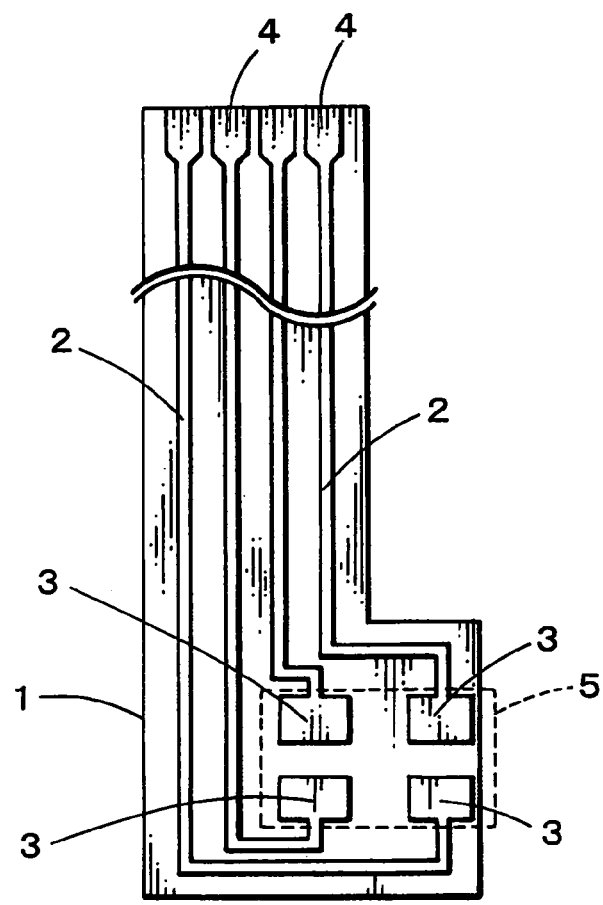
FIG. 1 is a plan view of a printed wiring board applied for a probe according to the present invention.

FIG. 1 shows a shape of a printed wiring board used in the probe for the electronic clinical thermometer of the present invention. a film-like board 1 is made of one of polyimide resin, polyethylene resin, polyester resin and the like, and a wiring pattern 2 made of a conductive foil is formed on a surface of the board. The wiring pattern 2 is provided at one end thereof with lands 3 for electrically connecting with electrodes 6 of the thin-film heat-sensitive elements 51a, 52a. The wiring pattern 2 is provided at the other end thereof with output terminals 4 leading output of the thin-film heat-sensitive elements through the lands 3 and being connected with a succeeding electronic circuit. In the printed wiring board 1, the wiring pattern, a area of which shall be covered for insulation, excluding the lands 3 and the output terminals 4 can be preferably covered with a cover coat (not. shown). In FIG. 1, a temperature sensor 5 is mounted and fixed at an area shown with dotted lines. Each land 3 and each electrode 6 of a first thin-film heat-sensitive element 51a and a second thin-film heat-sensitive element 52a structuring the temperature sensor 5 are electrically connected by conductive adhesive or solder. The temperature sensor 5 is preferably mounted so as to project slightly from the printed wiring board 1 for fixing one edge of the temperature sensor 5 tightly to an inner wall of a later-described bottomed metal pipe 8. The printed wiring board is not limited to the above flexible printed wiring board. a printed wiring board or a multi-layer printed wiring board made of a grass-cloth-based epoxy resin, a grass-cloth/non-woven-fabric-grass composite based epoxy resin or a grass-cloth-based polyimide resin, and a ceramic wiring board made of alumina or zirconia can be also applied.

Figure 2:
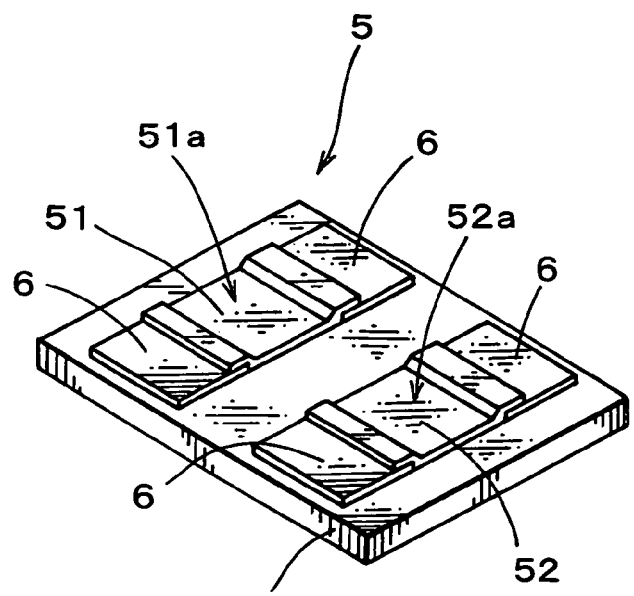
FIG. 2 is a perspective view of an embodiment of a thin-film heat-sensitive element applied for a temperature sensor of the probe according to the present invention.

FIG. 2 is a perspective view showing one example of the temperature sensor 5, on which the two thin-film heat-sensitive elements 51a, 52a are formed. The temperature sensor 5 includes the first thin-film heat-sensitive element 51a and the second thin-film heat-sensitive element 52a. In the temperature sensor 5, the electrodes 6 by a single layer or a thin-film multi-layer of platinum, chromium or gold are formed on the one substrate 7 made of alumina, zirconia, quartz, mullite, steatite and silicon. Between the electrodes 6, insulation coat of 0.1-1 micron thickness (not shown) is pattern-formed by means of spattering method or CVD method. The insulation coat prevents the substrate 7 and a part of material components composing a later-described heat-sensitive film from thermal diffusion. The insulation coat is not always required dependently to applied material components. The heat-sensitive films 51, 52 made of an oxide of a transition-metal, such as manganese, cobalt or nickel, are pattern-formed on the insulation coat by a known thin-film forming method, such as spattering method. a protecting insulation film (not shown) such as a silicon oxide film, a silicon nitride film, and a silicon oxynitride film can be preferably formed on the heat-sensitive films 51, 52 as a passivation film for protecting the heat-sensitive films 51, 52. Thus, heat-sensitive films 51, 52 are formed as thermistor films. The first thin-film heat-sensitive element 51a and the second thin-film heat-sensitive element 51b are arranged with a predetermined distance so as to have temperature gradient therebetween. Structures of the electrodes 6 and the heat-sensitive films 51, 52 are not limited above. a structure having electrodes formed on the heat-sensitive films on the substrate, a built-up structure of the electrode sandwiched by the heat-sensitive films, for example, one heat-sensitive film on the electrode on the other heat film on the substrate, a structure having a comb-shaped electrode corresponding to one of a pair of electrodes can be applied to select a most suitable structure for a purpose. The distance between the first thin-film heat-sensitive element 51a and the second thin-film heat-sensitive film 52a can be designed to form most suitable temperature gradient therebetween.

Figure 3:
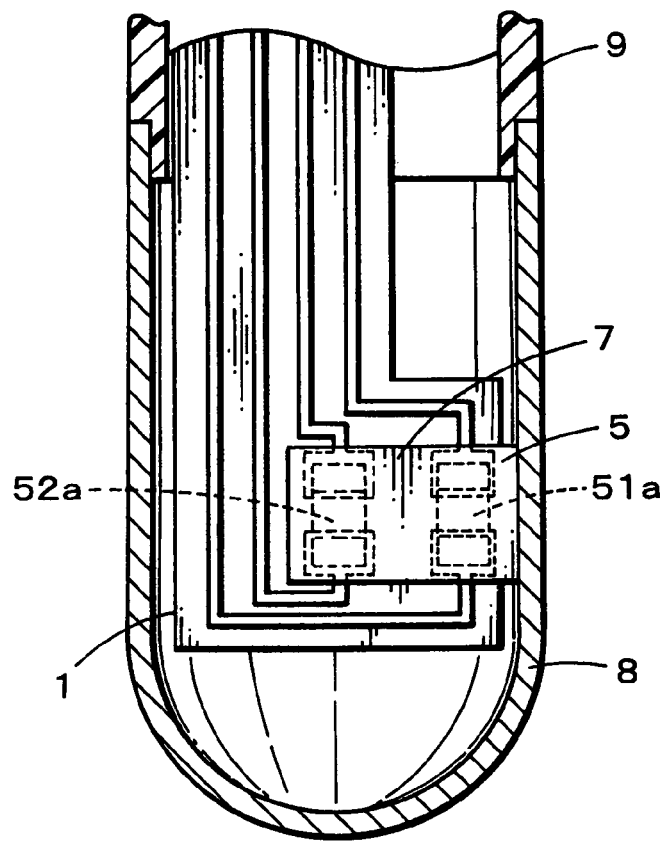
FIG. 3 is an expanded cross-sectional view of a top end of the probe according to the present invention.
Figure 5:
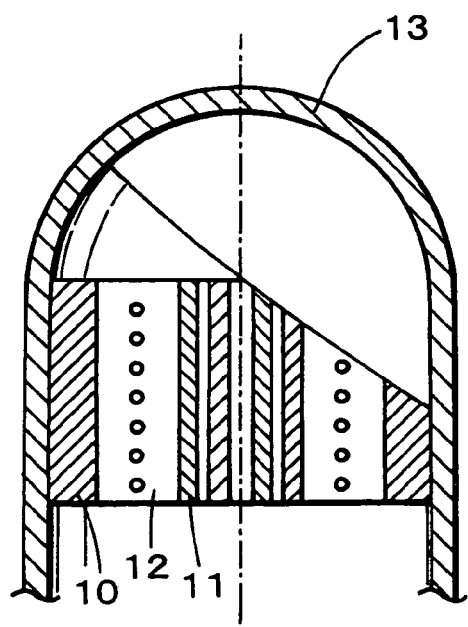
FIG. 5 is a cross-sectional view of a top end of a probe for a measuring method with heat flow by Prior Art.

FIG. 3 is a partially expanded cross-sectional view of the top end of the probe for the electronic clinical thermometer according to the present invention, showing the printed wiring board 1, on which the temperature sensor 5 is mounted, inserted into the bottomed metal pipe 8 and fixed thereon. The probe has a cylindrical housing 9 of the probe for the clinical thermometer. The bottomed metal pipe 8 is fitted into the top end of the housing 9. By inserting the one end of the printed wiring board 1, on which the temperature sensor 5 is mounted, into a bottom of the bottomed metal pipe 8, one side edge of the substrate 7, in the area of which the first thin-film heat-sensitive element is formed, touches on the inner wall of the bottomed metal pipe. By fixing the one side edge of the substrate of the temperature sensor 5 on the inner wall of the bottomed metal pipe 8 with one of resin and adhesive, even if vibration or shock is acted on the probe when the probe is used, damage of thermally touching the substrate and the inner wall of the bottomed metal pipe is prevented.

In FIG. 3, the probe for the electronic clinical thermometer including the temperature sensor, which is formed with the two thin-film heat-sensitive elements, on the printed wiring board is described. Without using the printed wiring board, the one side edge of the temperature sensor 5 can be fixed directly on the inner wall of the bottomed metal pipe 8 with adhesive or resin, and lead wires can be led directly from the respective electrodes 6 of the first thin-film heat-sensitive element 51a and the second thin-film heat-sensitive element 52a.

FIGS. 4A and 4B are an illustration and a graph showing principle of measurement with heat flux. When the top end of the bottomed metal pipe of the probe shown in FIG. 3 is touched to the surface of the human body, heat flows into the inner wall of the metal pipe, and after that, the heat flows from the one side edge of the substrate 7 touching on the inner wall through the substrate as shown in FIG. 4A. The temperature of the first thin-film heat-sensitive element (the first temperature sensor), one of the two elements formed nearer to the metal pipe, at the upstream side of the heat flow rises by the heat flow. Then, the temperature of the second thin-film heat-sensitive element (the second temperature sensor), the other of the two elements formed farther from the metal pipe, at the downstream side of the heat flow rises by the heat flow through the substrate. Relation of measurement values of temperatures by the first temperature sensor and the second temperature sensor is shown in FIG. 4B. According to the method of measuring heat flow, by measuring the temperatures of the first temperature sensor and the second temperature sensor and measuring changes of the temperatures, the deep body temperature can be calculated by the heat conduction equation, which shows relation between heat flow flowing in an object and temperature change of the object. By adjusting algorithm of prediction, temperature not only at deep part body but also any point including the surface of the human body can be predicted. The temperature can be given securely and faster than a usual clinical thermometer without waiting the sensor to reach in heat balance.

Figure 6:
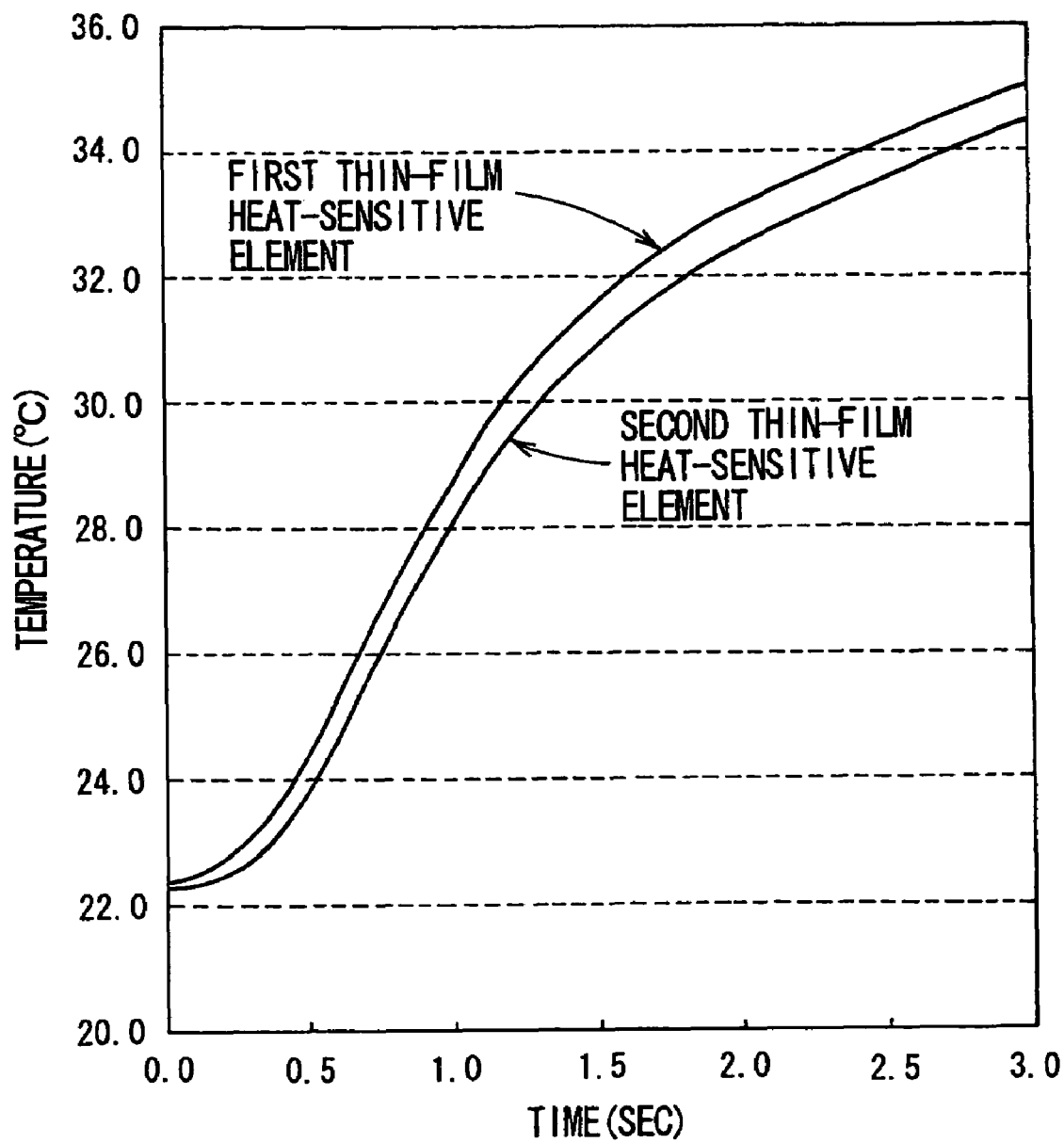
FIG. 6 is a graph of example response curves by the probe according to the present invention.

FIG. 6 shows a graph of response curves of the first thin-film heat-sensitive sensitive element and the second thin-film heat-sensitive element when the probe by the present invention is dipped into hot water of 41 degree C. The temperature sensor is structured by forming two thin-film heat-sensitive elements on a substrate of 1.0 mm length, 0.5mm width and 0.15 thickness with a gap G($\Delta$x)=240 micron. As shown in FIG. 6, Difference of temperature rising between at the first thin-film heat-sensitive element at the upstream side of the heat flow inputted from the one side edge of the substrate touching to the inner wall of the metal pipe and at the second thin-film heat-sensitive element at the downstream side of the heat flow farther from the inner wall of the metal pipe is generated. By measuring the temperatures and the changes of the first thin-film heat-sensitive element and the second thin-film heat-sensitive element based on the two response curves shown in FIG. 6, temperature at any point including the surface of the human body can be predicted by heat conduction equation.

The above embodiment is for applying the probe for clinical thermometer. The present invention is not limited to the embodiment, and can be applied to various probes for detecting temperature excluding the clinical thermometer.

What is claimed is:

1. A probe for an electronic clinical thermometer, comprising:
    a cylindrical housing;
    a metal pipe having a closed end and being fitted with an end of said cylindrical housing; and
    a temperature sensor being inserted and fixed in said metal pipe for measuring heat flux according to heat flow between a human body and the temperature sensor to predict a body temperature;
    wherein said temperature sensor includes a substrate and two thin-film heat-sensitive elements being formed on the substrate along the heat flow from a side edge of the substrate,
    wherein said substrate is arranged perpendicularly on an inner wall of the metal pipe so as to fix the side edge of the substrate tightly on the inner wall for thermally coupling the inner wall of the metal pipe and the substrate.

2. The probe for an electronic clinical thermometer according to claim 1, wherein the side edge of said substrate is fixed on the inner wall of the metal pipe with one of resin and adhesive.

3. The probe for an electronic clinical thermometer according to claim 1, further comprising a long strip printed wiring board having a wiring pattern to form lands at an end thereof and lead terminals, said printed wiring board being inserted in the metal pipe, wherein the temperature sensor is electrically connected with the lands at the end of the printed wiring board so as to fix the temperature sensor tightly on the inner wall of the metal pipe.

4. The probe for an electronic clinical thermometer according to claim 3, wherein the side edge of said substrate is fixed on the inner wall of the metal pipe with one of resin and adhesive.

5. The probe for an electronic clinical thermometer according to claim 1, wherein the two thin-film heat-sensitive elements formed on the substrate, which structures the temperature sensor, fixed on the inner wall of the metal pipe are arranged respectively at an upstream side and a downstream side of the heat flow.

6. The probe for an electronic clinical thermometer according to claim 5, further comprising a long strip printed wiring board having a wiring pattern to form lands at an end thereof and lead terminals, said printed wiring board being inserted in the metal pipe, wherein the temperature sensor is electrically connected with the lands at the end of the printed wiring board so as to fix the temperature sensor tightly on the inner wall of the metal pipe.

7. The probe for an electronic clinical thermometer according to claim 5, wherein the side edge of said substrate is fixed on the inner wall of the metal pipe with one of resin and adhesive.

* * * * *